July 17, 1928.                  S. A. STEEN                 1,677,603
                        GREASE GUN GREASE CONTAINER
                           Filed Nov. 3, 1924
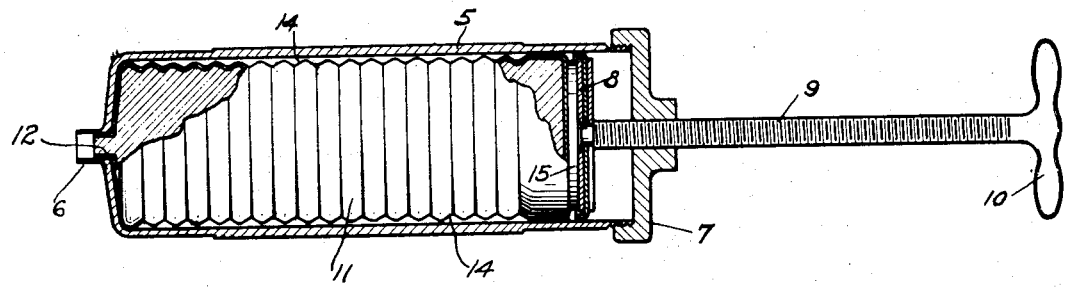
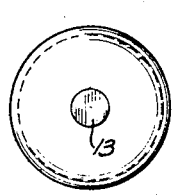
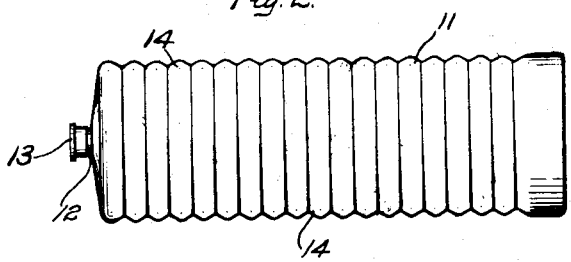
INVENTOR.
Svend A. Steen,
BY
Morsell, Keeney & Morsell,
ATTORNEYS.

Patented July 17, 1928.

1,677,603

UNITED STATES PATENT OFFICE.

SVEND A. STEEN, OF MILWAUKEE, WISCONSIN, ASSIGNOR TO WADHAMS OIL COMPANY, OF MILWAUKEE, WISCONSIN, A CORPORATION OF WISCONSIN.

GREASE-GUN GREASE CONTAINER.

Application filed November 3, 1924. Serial No. 747,569.

This invention relates to improvements in grease gun grease containers.

Automobiles and machinery in general are lubricated with grease and are now ordinarily supplied with grease fittings for easily connecting a gease gun thereto, and while it is simple to lubricate the parts, it is not so simple to charge the grease gun with the grease.

It is one of the objects of the present invention to overcome the before mentioned objectionable feature and provide a grease gun grease container which may be inserted in the gun for use in a very simple manner, and without the possibility of soiling the hands.

A further object of the invention is to provide a grease gun grease container in the shape of a cartridge formed of a collapsible material of a size to fit the bore of the gun, and adapted to be filled with a lubricant which is discharged from the container when within the gun.

A further object of the invention is to provide a grease container of corrugated form adapted to fold up or be crushed together along the lines of corrugations.

A further object of the invention is to provide a grease gun grease container which is of simple construction and inexpensive to manufacture, is strong and durable, and is well adapted for the purpose described.

With the above and other objects in view, the invention consists of the improved grease gun grease container and its parts and combinations as set forth in the claims and all equivalents thereof.

In the accompanying drawings in which the same reference characters indicate the same parts in all of the views:

Fig. 1 is a central longitudinal view of a grease or lubricating gun showing the improved grease container or cartridge positioned therein and ready for use;

Fig. 2 is a side view of the grease container or cartridge; and

Fig. 3 is an end view thereof.

Referring to the drawing, the numeral 5 indicates the cylinder of a grease or lubricating gun which is provided with a nozzle 6 at one end and a threaded cap 7 at its opposite end. A piston 8 is positioned within the cylinder and is connected to a stem 9 which extends through and is threaded to the cap 7. The outer end of the stem is formed with a handle 10 for convenience in turning the stem to force grease from the cylinder outwardly through the nozzle 6. The nozzle may be connected directly to a bearing lubricating fitting or an interposed flexible tube may be provided (not shown).

The improved grease container comprises a tubular member 11 preferably formed of sheet lead or other like flexible material. Said tubular member is closed at one end and is provided with a nozzle 12 at its opposite end which is of a size to closely fit into the nozzle 6 of an ordinary lubricating gun. A cap 13 threaded on said nozzle to close the same is kept thereon during handling, but before the container is placed within the grease gun the cap is removed.

To provide for the easy collapsing of the tube to discharge the lubricant, the tube is preferably formed with circumferential creases or corrugations 14 so that under pressure the tube will close or fold like an accordion. A disk 15 is interposed between the closed end of the collapsible tube and the piston to provide a flat surface to bear against the closed end portion of the tube.

In use, the container filled with grease is adapted to be sold over the counter, and when it is desired to recharge a grease gun, it is only necessary to unscrew the cap and place the container within the grease gun and the disk between the tube and the end of the grease gun which is then threaded on the end of the barrel of the gun. By threading the piston stem inwardly, the grease will be forced outwardly through the nozzle of the gun in the ordinary manner. When the grease is entirely discharged, the collapsed container may be easily pushed out of the grease gun and a filled container substituted therefor.

From the foregoing description, it will be seen that the grease gun grease container is of very simple construction and is well adapted for the purpose described.

What I claim as my invention is:

A grease gun grease container, comprising a cylindrical tubular lubricant container entirely closed at one end and formed of easily collapsible metal, said container having one end closed and at its opposite end having a nozzle of a size and shape to fit within the nozzle of the grease gun but not extend threrethrough, said container also having circumferential fold creases which engage the inner wall of the grease gun and with the closed end outer side portion of the container being engaged by the piston of the grease gun to force the lubricant from said container and through the nozzle of the container and the grease gun.

In testimony whereof, I affix my signature.

SVEND A. STEEN.